US009595071B2

(12) United States Patent
Morimoto et al.

(10) Patent No.: US 9,595,071 B2
(45) Date of Patent: Mar. 14, 2017

(54) DOCUMENT IDENTIFICATION AND INSPECTION SYSTEM, DOCUMENT IDENTIFICATION AND INSPECTION METHOD, AND DOCUMENT IDENTIFICATION AND INSPECTION PROGRAM

(71) Applicant: UBIC, INC., Tokyo (JP)

(72) Inventors: Masahiro Morimoto, Tokyo (JP); Hideki Takeda, Tokyo (JP); Kazumi Hasuko, Tokyo (JP)

(73) Assignee: UBIC, Inc., Tokyo (JP)

( * ) Notice: Subject to any disclaimer, the term of this patent is extended or adjusted under 35 U.S.C. 154(b) by 113 days.

(21) Appl. No.: 14/397,852

(22) PCT Filed: Mar. 17, 2014

(86) PCT No.: PCT/JP2014/057069
§ 371 (c)(1),
(2) Date: Oct. 29, 2014

(87) PCT Pub. No.: WO2015/059940
PCT Pub. Date: Apr. 30, 2015

(65) Prior Publication Data
US 2016/0155207 A1    Jun. 2, 2016

(30) Foreign Application Priority Data

Oct. 25, 2013 (JP) ................. 2013-222334

(51) Int. Cl.
*G06F 17/30* (2006.01)
*G06Q 50/18* (2012.01)
*G06Q 10/10* (2012.01)

(52) U.S. Cl.
CPC ....... *G06Q 50/18* (2013.01); *G06F 17/30011* (2013.01); *G06Q 10/10* (2013.01)

(58) Field of Classification Search
CPC .. G06Q 50/18; G06Q 10/10; G06F 17/30011; G06F 17/30997
(Continued)

(56) References Cited

U.S. PATENT DOCUMENTS 5,581,760 A * 12/1996 Atkinson ............... G06F 9/443
                                                707/E17.008
2003/0120507 A1* 6/2003 Aasman ............... G06Q 10/10
                                                705/1.1
(Continued)

FOREIGN PATENT DOCUMENTS

JP    2000-315207    11/2000
JP    2011-014086    1/2011
(Continued)

OTHER PUBLICATIONS

Japanese Office Action issued on Apr. 15, 2014 in Japanese Patent Application No. 2013-222334, and English translation thereof.

*Primary Examiner* — Hares Jami
(74) *Attorney, Agent, or Firm* — Lewis Roca Rothgerber Christie LLP

(57) ABSTRACT

A document classification and inspection system obtains digital information recorded in plural computers or servers, extracts a document from document information configured by plural documents, included in the obtained digital information, calculates a score indicating the strength of connection between the document and a classification code for the extracted document in a time-series manner, detects a time-series score change from the calculated score, and inspects the degree of relevance between an inspection case and the extracted document from the detected time-series score change.

7 Claims, 12 Drawing Sheets

(58) Field of Classification Search
USPC .............................. 707/603, 608, 736, 758
See application file for complete search history.

(56) References Cited

U.S. PATENT DOCUMENTS

2004/0049498 A1*  3/2004  Dehlinger ........... G06F 17/2785
2008/0162476 A1*  7/2008  Watanabe ......... G06F 17/30011

FOREIGN PATENT DOCUMENTS

| | | |
|---|---|---|
| JP | 2011-209930 | 10/2011 |
| JP | 2011-209931 | 10/2011 |
| JP | 2012-032859 | 2/2012 |
| JP | 2013-214152 | 10/2013 |

* cited by examiner

|  | CASE 1 | CASE 2 |
|---|---|---|
| NUMBER OF DOCUMENTS | 86,460 | 100,586 |
| NUMBER OF RELATED DOCUMENTS<br>PROPORTION OF RELATED DOCUMENTS (%) | 14,783<br>17.1% | 5,718<br>5.7% |
| NUMBER OF E-MAILS<br>PROPORTION OF E-MAILS (%) | 32,385<br>37.5% | 42,032<br>41.8% |
| NUMBER OF HOT E-MAILS<br>RATIO OF HOT E-MAILS TO ALL E-MAILS (%) | 122<br>0.4% | 134<br>0.3% |

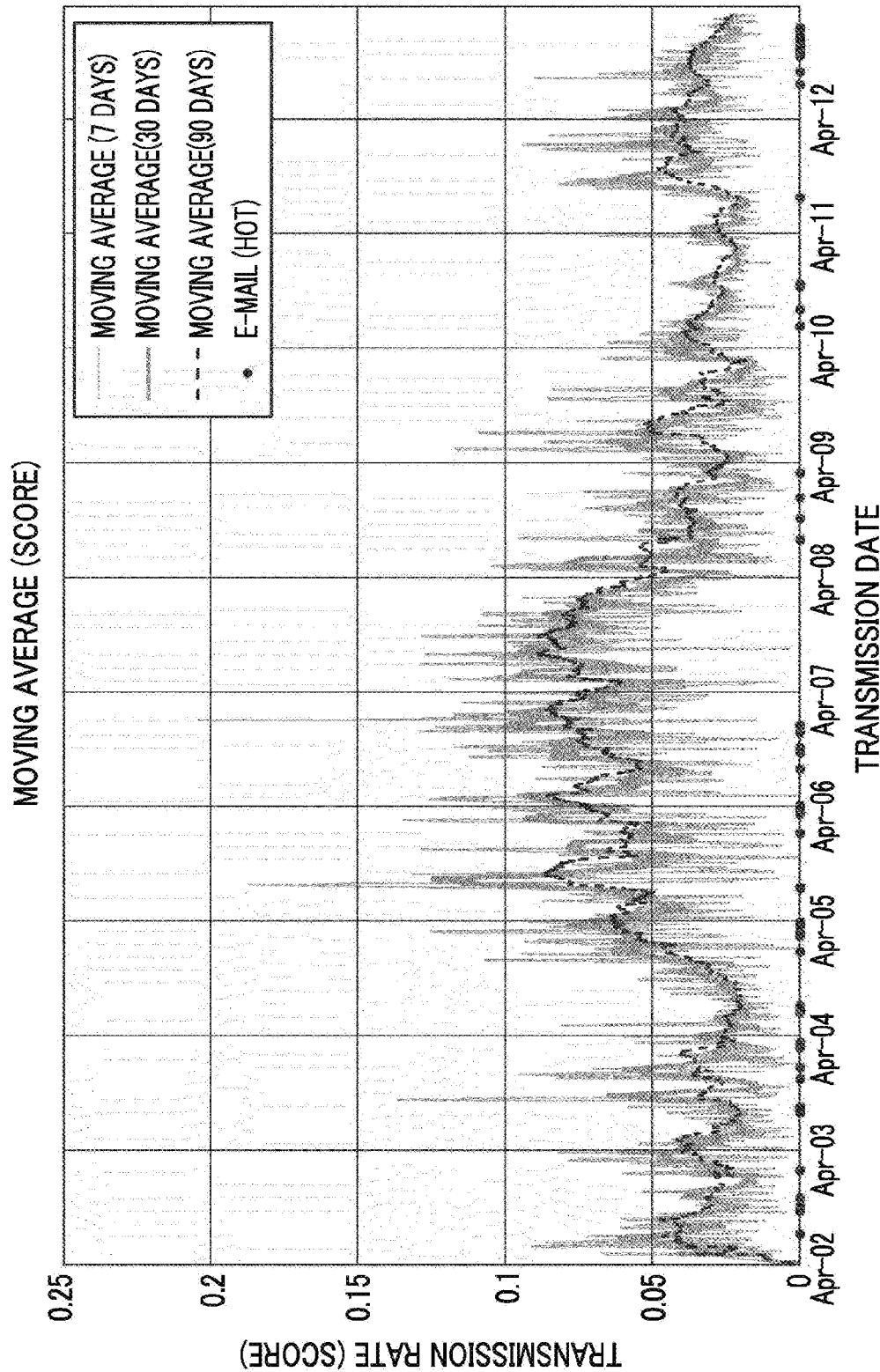

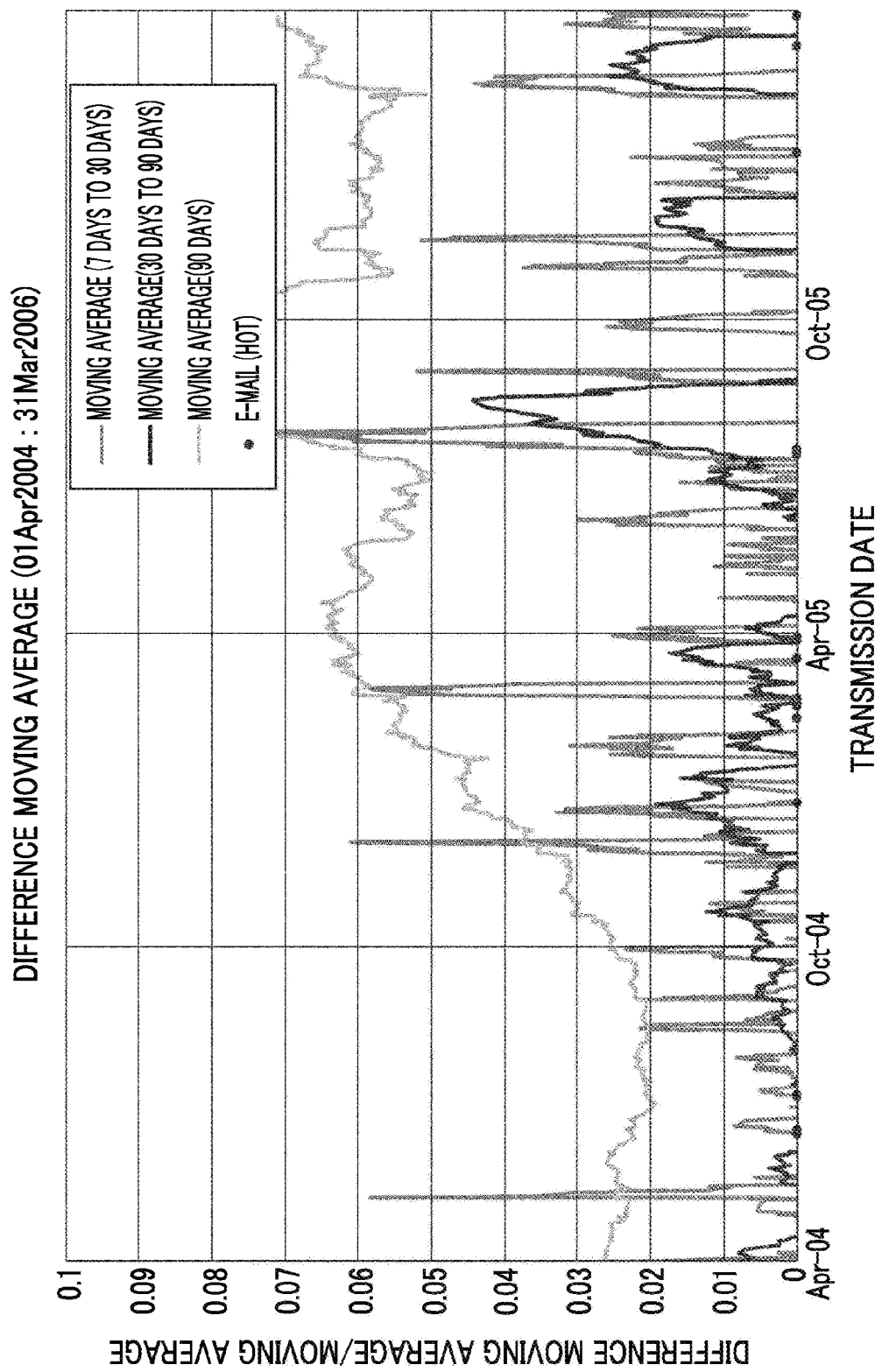

FIG. 7

DIFFERENCE MOVING AVERAGE AND TRANSMISSION DATE

| doc_id | date | sel | Scr | MA7-MA30 | MA30-MA90 | Comment |
|---|---|---|---|---|---|---|
| 20000108603 | 08-Jul-02 | s | 0.035 | | | |
| 20000108485 | 20-Sep-02 | s | 0.033 | | IN | |
| 20000106807 | 25-Sep-02 | r | 0.002 | | | |
| 20000108308 | 04-Oct-02 | r | 0.063 | | | |
| 20000108840 | 29-Oct-02 | s | 0.071 | EDGE | | |
| 20000106902 | 01-Nov-02 | r | 0.000 | EDGE | EDGE | |
| 20000108941 | 01-Nov-02 | s | 0.162 | | EDGE | |
| 20000101304 | 27-Jan-03 | r | 0.000 | IN | IN | |
| 20000110792 | 30-Jul-03 | s | 0.224 | EDGE | EDGE | |
| 20000110785 | 18-Aug-03 | s | 0.149 | IN | | |
| 20000106842 | 15-Nov-03 | r | 0.219 | IN | | |
| 20000101293 | 23-Dec-03 | r | 0.000 | | IN | |
| 20000101673 | 24-Feb-04 | r | 0.021 | | | |
| 20000106935 | 12-Mar-04 | r | 0.157 | | EDGE | |
| 20000108442 | 14-Jun-04 | s | 0.019 | EDGE | | |
| 20000106616 | 14-Jun-04 | r | 0.003 | EDGE | | |
| 20000108443 | 15-Jun-04 | s | 0.043 | EDGE | | |
| 20000108446 | 15-Jun-04 | s | 0.044 | EDGE | | |
| 20000108447 | 16-Jun-04 | s | 0.045 | EDGE | | |
| 20000106582 | 16-Jun-04 | r | 0.000 | EDGE | | |
| 20000108449 | 16-Jun-04 | s | 0.006 | EDGE | | |
| 20000108456 | 06-Jul-04 | s | 0.044 | EDGE | EDGE | |
| 20000108457 | 06-Jul-04 | s | 0.046 | EDGE | EDGE | |
| 20000106796 | 06-Jul-04 | r | 0.005 | EDGE | EDGE | |
| 20000104295 | 24-Dec-04 | s | 0.034 | | IN | |
| 20000102561 | 11-Feb-05 | r | 0.040 | | IN | |
| 20000102567 | 18-Feb-05 | r | 0.014 | | IN | |
| 20000102556 | 21-Feb-05 | r | 0.028 | | IN | |
| 20000104823 | 23-Feb-05 | s | 0.023 | | IN | |
| 20000106788 | 18-Mar-05 | r | 0.097 | | IN | |
| 20000108314 | 29-Mar-05 | s | 0.023 | EDGE | EDGE | |
| 20000108316 | 30-Mar-05 | s | 0.229 | EDGE | EDGE | |
| 20000130101 | 15-Jul-05 | r | 0.234 | EDGE | IN | |
| 20000130105 | 18-Jul-05 | r | 0.274 | IN | | |
| 20000119639 | 07-Jan-06 | r | 0.067 | EDGE | | |
| 20000105477 | 10-Mar-06 | s | 0.033 | | IN | |
| 20000126454 | 28-Mar-06 | r | 0.144 | | EDGE | |
| 20000105593 | 03-Apr-06 | r | 0.187 | EDGE | | |
| 20000121525 | 01-Aug-06 | r | 0.018 | | IN | |
| 20000115313 | 22-Sep-06 | r | 0.497 | | IN | |
| 20000115314 | 25-Sep-06 | r | 0.546 | | IN | |
| 20000115315 | 26-Sep-06 | r | 0.512 | | IN | |
| 20000115317 | 04-Oct-06 | r | 0.513 | EDGE | EDGE | |
| 20000115318 | 08-Oct-06 | r | 0.543 | EDGE | EDGE | |
| 20000121046 | 24-Nov-06 | s | 0.001 | EDGE | | |
| 20000106040 | 15-Dec-06 | r | 0.034 | | IN | |
| 20000119852 | 19-Dec-06 | r | 0.014 | IN | IN | |
| 20000135888 | 02-Aug-08 | r | 0.333 | EDGE | EDGE | |
| 20000135896 | 02-Aug-08 | r | 0.347 | EDGE | EDGE | |
| 20000135989 | 09-Oct-08 | r | 0.210 | | | |

| doc_id | date | sel | Scr | MA7-MA30 | MA30-MA90 | Comment |
|---|---|---|---|---|---|---|
| 20000139005 | 15-Dec-08 | r | 0.204 | EDGE | EDGE | |
| 20000117958 | 02-Mar-09 | r | 0.010 | | | |
| 20000295270 | 14-Jun-10 | s | 0.017 | IN | | |
| 20000283354 | 06-Aug-10 | r | 0.006 | EDGE | | |
| 20000283927 | 20-Oct-10 | s | 0.285 | IN | IN | |
| 20000260613 | 26-Oct-10 | r | 0.147 | IN | IN | |
| 20000263046 | 27-Oct-10 | s | 0.300 | IN | IN | |
| 20000260185 | 31-Jul-11 | r | 0.068 | EDGE | EDGE | |
| 20000262282 | 27-Jul-12 | r | 0.019 | EDGE | IN | |
| 20000232217 | 18-Jul-12 | s | 0.033 | EDGE | IN | |
| 20000258531 | 04-Sep-12 | r | 0.053 | | IN | |
| 20000258530 | 05-Sep-12 | r | 0.003 | | IN | |
| 20000258529 | 05-Sep-12 | s | 0.058 | | IN | |
| 20000257714 | 25-Oct-12 | r | 0.046 | | | |
| 20000257710 | 06-Nov-12 | s | 0.051 | EDGE | | |
| 20000257708 | 06-Nov-12 | r | 0.033 | EDGE | | |
| 20000257708 | 07-Nov-12 | r | 0.041 | EDGE | | |
| 20000285997 | 08-Nov-12 | s | 0.288 | EDGE | | |
| 20000257705 | 15-Nov-12 | s | 0.024 | | | |
| 20000257695 | 21-Nov-12 | s | 0.063 | | | Frequent communication with the specific person (the same domain) |
| 20000257683 | 28-Nov-12 | s | 0.017 | | | |
| 20000257682 | 29-Nov-12 | s | 0.053 | | | |
| 20000257681 | 29-Nov-12 | s | 0.015 | | | |
| 20000257679 | 04-Dec-12 | s | 0.219 | | | |
| 20000257678 | 04-Dec-12 | r | 0.241 | | | |
| 20000257677 | 10-Dec-12 | r | 0.024 | | | |
| 20000257675 | 17-Dec-12 | s | 0.070 | | | |
| 20000257674 | 19-Dec-12 | s | 0.093 | | | |
| 20000257673 | 20-Dec-12 | s | 0.096 | | | |
| 20000257672 | 20-Dec-12 | r | 0.106 | | | |
| 20000257671 | 27-Dec-12 | s | 0.060 | | | |
| 20000257670 | 27-Dec-12 | s | 0.023 | | | |
| 20000257668 | 17-Jan-13 | r | 0.035 | | | |
| 20000257667 | 17-Jan-13 | r | 0.035 | | | |
| 20000260859 | 23-Jan-13 | r | 0.026 | | | |
| 20000100451 | | | 0.061 | | | |

(Left-side comments column includes: "Different send adress", "Different send adress", "Different send adress")

DOCUMENT IDENTIFICATION AND INSPECTION SYSTEM, DOCUMENT IDENTIFICATION AND INSPECTION METHOD, AND DOCUMENT IDENTIFICATION AND INSPECTION PROGRAM

BACKGROUND OF THE INVENTION

Field of the Invention

The present invention relates to a document classification and inspection system, a document classification and inspection method, and a document classification and inspection program, and particularly, to a document classification and inspection system, a document classification and inspection method, and a document classification and inspection program for classifying and inspecting documents in a time-series manner according to an inspection case.

Background Art

In the background art of the invention, a case where a lawsuit case or an illegality inspection case is an inspection case is described. In the related art, when a crime or a legal dispute relating to a computer such as unauthorized access or confidential information leakage occurs, means or a technique for collecting and analyzing devices, data, and electronic records necessary for cause examination or criminal investigation to clarify legal evidentiality has been proposed.

Particularly, in a US civil suit, eDiscovery (electronic discovery) or the like is required, and both of an accuser and a defendant in a lawsuit should submit related digital information as evidence. Thus, digital information recorded in a computer or a server should be submitted as evidence.

On the other hand, in a current business world, since most information is prepared by a computer according to rapid development and spread of IT technology, a large amount of digital information is oversupplied even in the same company.

Thus, in the course of performing preparation work for producing evidentiary materials for a law court, an error that even confidential digital information that is not necessarily related to a lawsuit is included as the evidentiary materials may easily occur. Further, confidential document information that is not related to the lawsuit may be produced.

In recent years, a technique relating to document information in a forensic system has been proposed in Japanese Unexamined Patent Application Publication No. 2011-209930, Japanese Unexamined Patent Application Publication No. 2011-209931, and Japanese Unexamined Patent Application Publication No. 2012-32859. Japanese Unexamined Patent Application Publication No. 2011-209930 discloses a forensic system that designates a specific person from at least one or more users included in user information, extracts only digital document information that is accessed by the specific person based on access history information relating to the designated specific person, sets accessory information indicating whether each of document files of the extracted digital document information is related to the lawsuit, and outputs a document file relating to the lawsuit based on the accessory information.

Further, Japanese Unexamined Patent Application Publication No. 2011-209931 discloses a forensic system that displays recorded digital information, sets user specific information indicating which user among users included in user information each of plural document files relates to, sets the set user specific information to be recorded in a storing unit, designates at least one or more users, retrieves a document file for which the user specific information corresponding to the designated user is set, sets accessory information indicating whether the retrieved document file is related to a lawsuit, and outputs the document file relating to the lawsuit based on the accessory information through a display unit.

In addition, Japanese Unexamined Patent Application Publication No. 2012-32859 discloses a forensic system that receives designation of at least one or more document files included in digital document information, receives designation of a language for translating the designated document file, translates the document file of which the designation is received into the language of which the designation is received, extracts a common document file that represents the same content as that of the designated document file from the digital document information recorded in a recording unit, generates translation related information indicating that the extracted common document file is translated by quoting the translation content of the translated document file, and outputs a document file relating to a lawsuit based on the translation related information.

SUMMARY OF THE INVENTION

However, for example, in the forensic system in Japanese Unexamined Patent Application Publication No. 2011-209930, Japanese Unexamined Patent Application Publication No. 2011-209931, and Japanese Unexamined Patent Application Publication No. 2012-32859, a huge amount of document information of users made by plural computers and servers should be collected.

Work for determining whether the huge amount of digital document information is valid as evidentiary materials for a lawsuit should be performed by visual confirmation of a user called a reviewer, and the document information should be classified piece by piece, which causes a large amount of labor and high cost.

Further, in the related art document classification, the classification is performed based on different features of documents, but the classification and inspection are not performed for a temporal change of the features of the documents that occurs according to a change of a person or an organization that the person belongs to.

In order to solve the problems, an object of the invention is to provide a document classification and inspection system, a document classification and inspection method, and a document classification and inspection program capable of detecting a time-series change of quality of a document generated according to time transition in document classification, and reducing the burden of classification work.

According to an aspect of the invention, there is provided a document classification and inspection system that obtains digital information recorded in a plurality of computers or servers, analyzes document information configured by a plurality of documents, included in the obtained digital information, and assigns a classification code indicating the degree of relevance with an inspection case to a document to make easy use of the inspection case to inspect the degree of relevance between the inspection case and the document, including: a score calculating unit that extracts a document from the document information and calculates, with respect to the extracted document, a score indicating the strength of connection of the document and the classification code in a time-series manner; a score change detecting unit that detects a time-series score change from the calculated score; and a score change determining unit that inspects and determines the degree of relevance between the inspection case and the extracted document from the detected time-series score change.

According to another aspect of the invention, there is provided a document classification and inspection method for obtaining digital information recorded in a plurality of computers or servers, analyzing document information configured by a plurality of documents, included in the obtained digital information, and assigning a classification code indicating the degree of relevance with an inspection case to a document to make easy use of the inspection case to inspect the degree of relevance between the inspection case and the document, the method causing a computer to execute a process including: extracting a document from a document information, and calculating, with respect to the extracted document, a score indicating the strength of connection of the document and a classification code in a time-series manner; detecting a time-series score change from the calculated score; and inspecting the degree of relevance between the inspection case and the extracted document from the detected time-series score change.

According to still another aspect of the invention, there is provided a document classification and inspection program for obtaining digital information recorded in a plurality of computers or servers, analyzing document information configured by a plurality of documents, included in the obtained digital information, and assigning a classification code indicating the degree of relevance with an inspection case to a document to make easy use of the inspection case to inspect the degree of relevance between the inspection case and the document, the program causing a computer to execute functions including: a function of extracting a document from the document information and calculating, with respect to the extracted document, a score indicating the strength of connection of the document and the classification code in a time-series manner; a function of detecting a time-series score change from the calculated score; and a function of inspecting the degree of relevance between the inspection case and the extracted document from the detected time-series score change.

In the invention, the "score" refers to a value obtained by quantitatively evaluating the strength of connection with a specific classification code in a certain document.

According to the invention, the document is extracted from the document information, the score indicating the strength of connection between the document and the classification code is calculated in a time series manner with respect to the extracted document, the time-series score change is detected from the calculated score, and the degree of relevance between the inspection case and the extracted document is inspected from the detected time-series score change. Thus, it is possible to provide a document classification and inspection system, a document classification and inspection method, and a document classification and inspection program capable of detecting a time-series change of quality of a document generated according to time transition in document classification, and reducing the burden of classification work.

BRIEF DESCRIPTION OF THE DRAWINGS

FIG. 5 is a graph illustrating the relationship between a moving average of scores and a transmission date in the document classification and inspection method according to the embodiment of the invention.

FIG. 6 is a graph illustrating the relationship between a difference between moving averages of scores and a transmission date in the document classification and inspection method according to the embodiment of the invention.

FIG. 7 is a table illustrating the relationship between a difference between moving averages of scores (DMA), a transmission date, a main (rise) end section, and "IN".

DETAILED DESCRIPTION OF THE INVENTION

Embodiment of the Invention

A document classification and inspection system according to an embodiment of the invention is a document classification and inspection system that obtains a large amount of digital information (metadata) recorded in plural computers or servers, analyzes document information configured by plural documents, included in the obtained digital information, in a time series manner, and provides a classification code and a score indicating the degree of relevance with an inspection case to a document to make easy use of the inspection case.

Here, for example, a case relating to a lawsuit, an illegality inspection, a financial practice, a weather event, or diagnosis and treatment of a disease is selected as the inspection case.

Further, analysis of the time-series data of the documents according to the embodiment of the invention may be independently executed as analysis of the time-series data, but for example, may be executed in a document classification process in association with classification of the documents. Thus, an example of the analysis of the time-series data according to the embodiment of the invention is disclosed in association with the classification of the documents.

Figure 1:
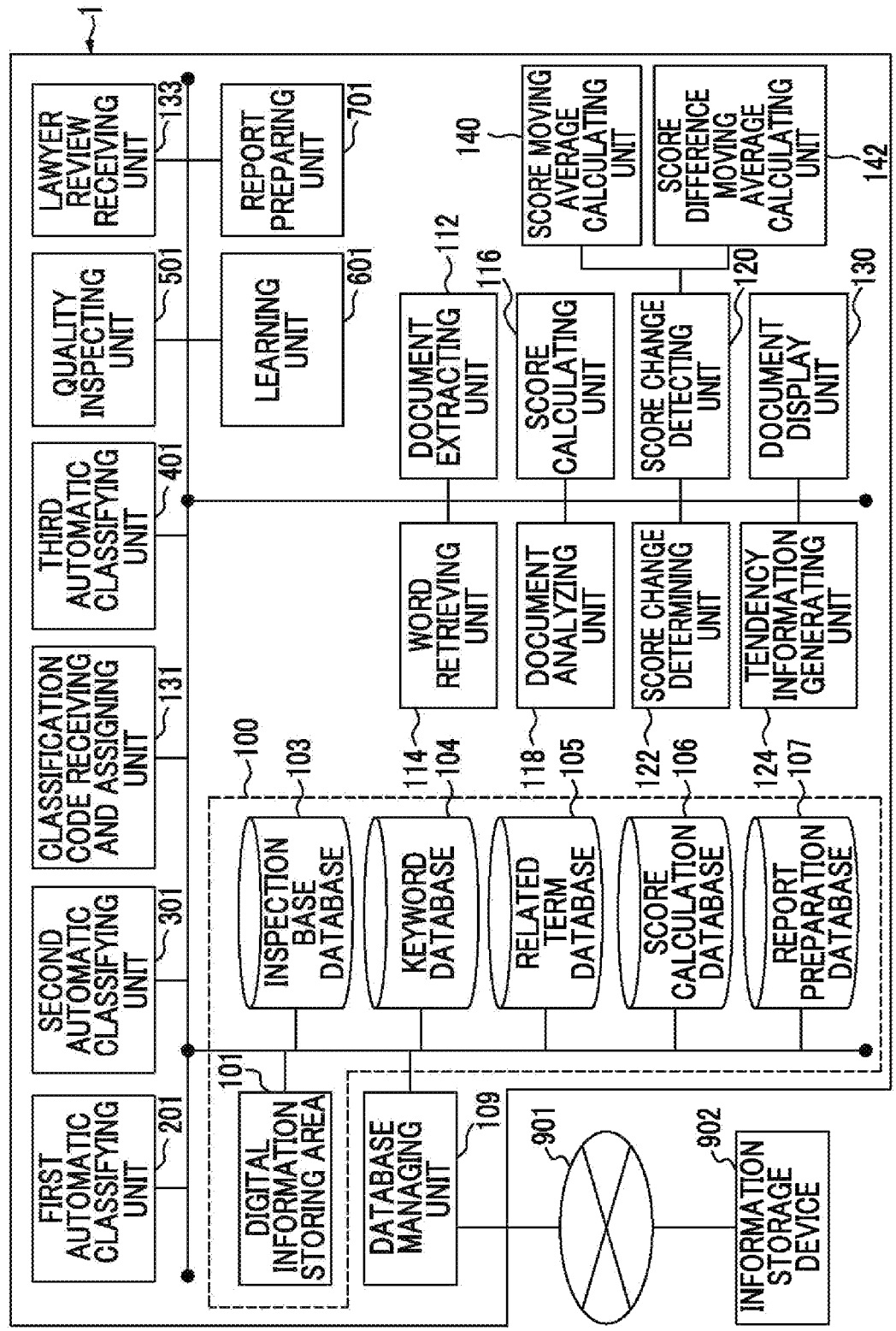
FIG. 1 is a configuration diagram illustrating a document classification and inspection system according to an embodiment of the invention.

FIG. 1 shows a configuration of a document classification and inspection system according to an embodiment of the invention. A configuration of the document classification and inspection system according to the embodiment of the invention will be described hereinafter with reference to FIG. 1 using a case where a lawsuit is used as an inspection case as an example.

The document classification and inspection system 1 according to the embodiment includes a data storing unit 100 that stores information and data. The data storing unit 100 stores digital data obtained from plural computers or servers in a digital information storage area 101 for use in analysis of a lawsuit or an illegality inspection.

Further, the data storing unit 100 includes an inspection base database 103 that stores a category attribute indicating that information belongs to either category of a lawsuit case including antitrust, patents, the Foreign Corrupt Practices Act (FCPA) or products liability (PL), or an illegality inspection including information leakage or false invoicing, a company name, a person in charge, a custodian, and a configuration of an inspection or classification input screen; a keyword database 104 that registers a specific classification code of a document included in the obtained digital information, a keyword having a close relationship with the specific classification code, and keyword correspondence information indicating a correspondence relationship between the specific classification code and the keyword; a related term database 105 that registers a predetermined classification code, a related term formed by a word having a high appearance frequency in a document to which the predetermined classification code is assigned, and related term correspondence information indicating a correspondence relationship between the predetermined classification code and the related term; and a score calculation database 106 that registers a weight of a word included in a document to calculate a score indicating the strength of connection between the document and the classification code. Further, the data storing unit 100 stores a report preparation database 107 that registers the format of a report determined according to the content of a category, a custodian, and a classification operation. The data storing unit 100 may be provided in the document classification and inspection system 1, as shown in FIG. 1, or may be provided outside the document classification and inspection system 1 as a separate storage device.

The document classification and inspection system 1 according to the embodiment of the invention includes a database managing unit 109 that manages updating of the data content of the inspection base database 103, the keyword database 104, the related term database 105, the score calculation database 106, and the report preparation database 107. The database managing unit 109 may be connected to an information storage device 902 through an exclusive connection line or an internet line 901. Further, the database managing unit 109 may update the data content of the inspection base database 103, the keyword database 104, the related term database 105, the score calculation database 106, and the report preparation database 107, based on the content of the data stored in the information storage device 902.

The document classification and inspection system 1 according to the embodiment of the invention includes a document extracting unit 112 that extracts plural documents from the document information, a word retrieving unit 114 that retrieves a keyword or a related word recorded in the database from the document information, and a score calculating unit 116 that calculates the score indicating the strength of connection between the document and the classification code. In the embodiment of the invention, the score calculating unit 116 calculates the score in a time series manner.

The document classification and inspection system 1 according to the embodiment of the invention includes a score change detecting unit 120 that detects the time-series score change from the calculated score, and a score change determining unit 122 that inspects and determines the degree of relevance between the inspection case and an extracted document from the detected time-series score change. Further, in order to detect the time-series score change, the score change detecting unit 120 includes a score moving average calculating unit 140 that calculates a moving average of the scores, and a score difference moving average calculating unit 142 that calculates a difference moving average of the scores from a short period moving average of the scores and a long period moving average of the scores.

The document classification and inspection system 1 according to the embodiment of the invention includes a first automatic classifying unit 201 that retrieves the keyword recorded in the keyword database 104 by the word retrieving unit 114, extracts a document including the keyword from the document information, and automatically assigns a specific classification code to the extracted document based on the keyword correspondence information; and a second automatic classifying unit 301 that extracts a document including the related term recorded in the related term database from the document information, calculates the score based on an evaluation value of the related term included in the extracted document and the number of the related terms, and automatically assigns a predetermined classification code to a document in which the score exceeds a predetermined value, among the documents including the related term, based on the score and the related term correspondence information.

Further, the document classification and inspection system 1 according to the embodiment includes a document display unit 130 that displays plural documents extracted from the document information on a screen; a classification code receiving and assigning unit 131 that receives, with respect to plural documents to which classification codes are not assigned, extracted from the document information, a classification code assigned by a user based on the relevance with the lawsuit to assign the classification code; a document analyzing unit 118 that analyzes the document to which the classification code is assigned by the classification code receiving and assigning unit 131; and a third automatic classifying unit 401 that automatically assigns a classification code based on the analysis result obtained by analyzing the document to which the classification code is assigned by the classification code receiving and assigning unit 131 by the document analyzing unit 118.

The document analyzing unit 118 may also analyze a document to which a classification code is automatically assigned by a computer according to the keyword, the related term, and the score value in the first automatic classifying unit 201 and the second automatic classifying unit 301, in addition to the documents that are assigned the classification code received from the user based on the relevance with the lawsuit, and may integrate a document of which the classification code is received from the user with a document to which the classification code is automatically assigned by the computer to obtain a general analysis result. In this case, the third automatic classifying unit 401 may automatically assign the classification code based on the general analysis result.

A method for performing classification and inspection includes various methods including automatic classification based on word retrieval, reception of classification and inspection from a user, automatic classification and inspection using a score value, automatic classification and inspection with a learning process, automatic classification and inspection with quality assurance, or the like.

The document analyzing unit 118 may analyze a performance history indicating a performance order of various classification operations and inspection operations and a combination thereof, and plural documents to which the classification code is assigned. Further, a report preparing unit 701 to be described later may report the analysis result.

Further, although not shown, the document classification and inspection system 1 according to the embodiment of the invention includes a language determining unit that determines the kind of a language of the extracted document, and a translating unit that translates the extracted document according to reception of a user's designation or in an automatic manner. It is preferable that division of languages in the language determining unit be made shorter than one sentence in order to handle a complex language in which multiple languages are present in one sentence. Further, one or both of predictive coding and character coding may be used for determination of the language. In addition, a process of deleting an HTML header or the like from a translation target may be performed.

In addition, the document classification and inspection system 1 according to the embodiment of the invention may include a tendency information generating unit 124 that generates tendency information indicating a similarity degree of each document with respect to the document to which the classification code is assigned, based on the type of a word included in each document, the number of appearances of the word, and an evaluation value of the word, for the analysis in the document analyzing unit 118.

In addition, the document classification and inspection system 1 according to the embodiment of the invention may include a quality inspecting unit 501 that compares the classification code received by the classification code receiving and assigning unit 131 with the classification code assigned by the tendency information in the document analyzing unit 118 to verify the validity of the classification code received by the classification code receiving and assigning unit 131.

Further, the document classification and inspection system 1 according to the embodiment of the invention may include a learning unit 601 that learns a weight of each word or related term based on the result of the document classification process.

The document classification and inspection system 1 according to the embodiment of the invention includes a report preparing unit 701 that performs an output of an optimal inspection report according to the inspection type of the lawsuit case or the illegality inspection, based on the result of the document classification process. The lawsuit case includes antitrust (cartel), patents, the Foreign Corrupt Practices Act (FCPA), or products liability (PL), for example. Further, the illegality inspection includes information leakage or false invoicing, for example.

The document classification and inspection system 1 according to the embodiment of the invention includes a lawyer review receiving unit 133 that receives chief lawyer or patent attorney's review, in order to enhance the quality of the classification and inspection and report and to clarify the responsibility of the classification and inspection and report.

For ease of understanding of the document classification and inspection system 1 according to the embodiment of the invention, specific terms in the embodiment will be described below.

The "classification code" refers to an identifier used in classifying documents, which represents the degree of relevance with a lawsuit to make easy use of the lawsuit. For example, when the document information is used as evidence in the lawsuit, the classification code may be assigned according to the type of the evidence.

The "document" refers to data including one or more words. As an example of the "document", an electronic mail, a presentation material, a spreadsheet material, a meeting reference, a contract, an organization chart, a business plan or the like may be used.

The "word" refers to a gathering of a minimum character string having a meaning. For example, in the sentence "document refers to data including one or more words", words of "document", "one", "or more", "including", "words", "data", and "refers to" are included.

The "keyword" refers to a gathering of a character string having a certain meaning in a certain language. For example, in selecting a keyword from the sentence "classify a document", "document" and "classify" may be used as the keywords. In the embodiment, a keyword such as "infringement", "lawsuit" or "Patent Publication No" is frequently selected.

In the present embodiment, it is assumed that the keyword includes a morpheme.

Further, the "keyword correspondence information" refers to information indicating a correspondence relationship between a keyword and a specific classification code. For example, when a classification code "important" indicating an important document in a lawsuit has a close relationship with a keyword "infringer", the "keyword correspondence information" may represent information that associates the classification code "important" with the keyword "infringer" for management.

The "related term" represents a word having an evaluation value that is equal to or higher than a predetermined value among words common to documents to which a predetermined classification code is assigned and having a high appearance frequency. For example, the appearance frequency represents an appearance ratio of the related term with respect to the total number of words that appear in one sentence.

Further, the "evaluation value" represents the amount of information that each word shows in a certain sentence. The "evaluation value" may be calculated with reference to the amount of transmission information. For example, when a predetermined brand name is assigned as the classification code, the "related term" may indicate a name of a technical field to which each commodity belongs, a sales country of the commodity, a name of a similar commodity to the commodity, or the like. Specifically, when the commodity name of the apparatus that performs an image encoding process is assigned as the classification code, the "related term" may be "encoding", "Japan", "encoder", or the like.

The "related term correspondence information" represents a correspondence relationship between the related term and the classification code. For example, when a classification code called "product A" that is a commodity name in a lawsuit has a related term "image encoding" that is a function of the product A, the "related term correspondence information" may represent information that associates the classification code "product A" with the related term "image encoding" for management.

The "score" represents a value obtained by quantitatively evaluating the strength of connection with a specific classification code in a certain document. In each embodiment of the invention, for example, the score is calculated by words that appear in a document and an evaluation value of each word, using the following expression (1).

$$Scr = \Sigma_{i=0}^{N} i * (m_i * wgt_i^2) / \Sigma_{i=0}^{N} i * wgt_i^2 \quad (1)$$

Scr: score of document $m_i$: appearance frequency of i-th keyword or related term $wgt^2_i$: weight of i-th keyword or related term Further, the document classification analysis system 1 of the invention may extract a word that frequently appears in documents to which the classification code assigned by a user is common. In addition, the document classification analysis system 1 may analyze the type of the extracted word, the evaluation value of each word, and the tendency information of the number of appearances, for each document, and may assign the common classification code to the documents having the same tendency as the analyzed tendency information among the documents of which the classification code is not received by the classification code receiving and assigning unit.

Here, the "tendency information" represents a similarity degree of each document with respect to the document to which the classification code is assigned, which represents the degree of relevance with a predetermined classification code, based on the type of a word included in each document, the number of appearances of the word, and the evaluation value of the word. For example, when each document is similar to the document to which the predetermined classification code is assigned in the degree of relevance with the predetermined classification code, it is said that two documents have the same tendency information. Further, if words having the same evaluation value are included in documents with the same number of appearances, even though the types of the words included in the documents are different from each other, two documents may be set as documents having the same tendency.

Further, the document classification and inspection system 1 of the invention may include a quality inspecting unit that determines a classification code to be assigned based on the analyzed tendency information with respect to the document of which the classification code is assigned by the user, and compares the determined classification code with the classification code assigned by the user to verify the validity.

Figures 2, 3:
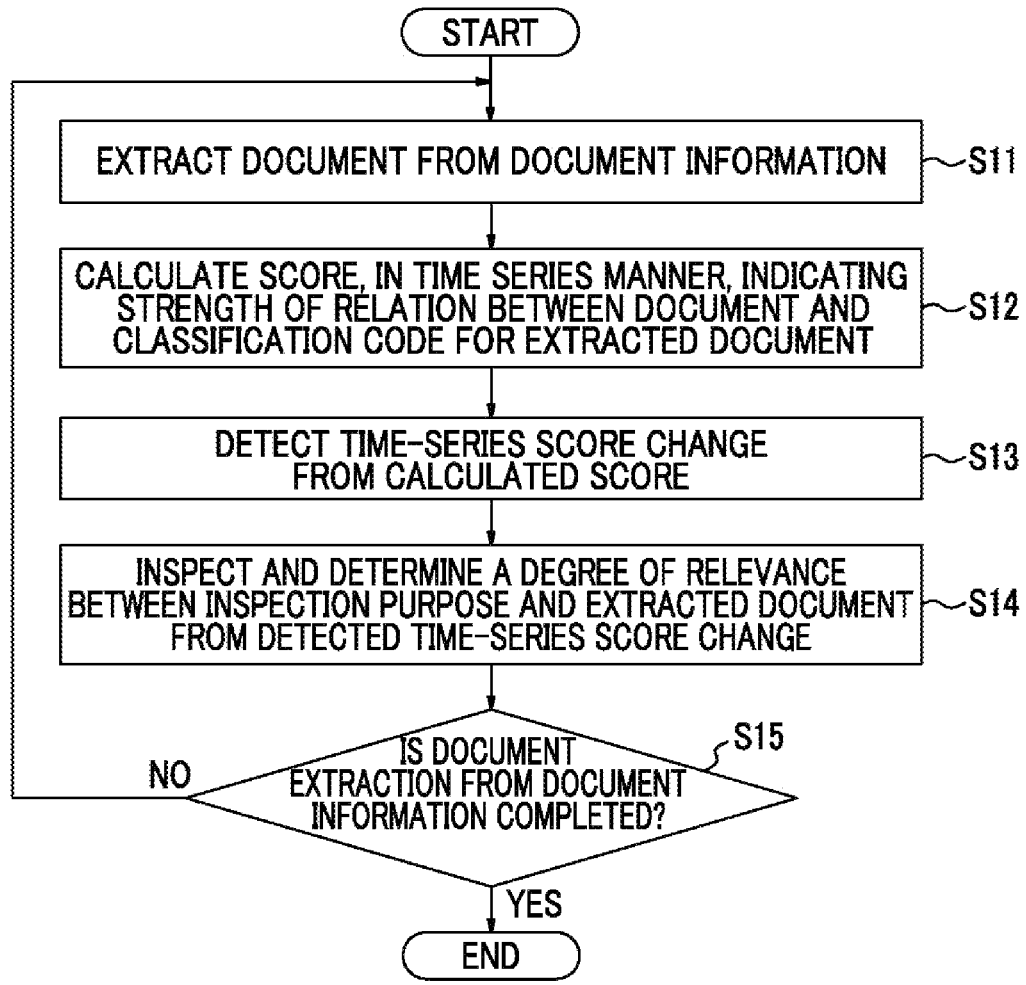
FIG. 2 is a chart illustrating the flow of processes in a document classification and inspection method according to an embodiment of the invention.
FIG. 3 is a table illustrating attributes of document case 1 and document case 2 that are inspection targets in the document classification and inspection method according to the embodiment of the invention.

FIG. 2 is a flowchart illustrating a document classification analysis method, according to an embodiment of the invention, for calculating the score indicating the strength of connection between the document and the classification code in a time series manner with respect to the extracted document to inspect and determine the degree of relevance between an inspection purpose and the extracted document. The document classification and inspection method according to the embodiment of the invention will be described with reference to FIG. 2.

A document is extracted from digital document information recorded in plural computers or servers (S11).

A score indicating the strength of connection between the document and a classification code is calculated in a time series manner for the document extracted for prediction coding (S12).

A time-series change of the score is detected for each document from the calculated score (S13).

The degree of relevance between the inspection purpose and the extracted document is inspected and determined from the detected time-series score change (S14). As the time-series score change, a time when the score changes to exceed a predetermined reference value, or the like may be used, for example.

It is determined whether the extraction of the documents for which the degree of relevance between the inspection purpose and the extracted document is inspected and determined is completed. If the extraction of the documents is completed, the extraction and the inspection determination are terminated, and if the extraction of the documents is not completed, the extraction and the inspection determination are repeated (S11 to S14).

The document classification and inspection method according to the embodiment of the invention will be further described.

FIG. 3 is a table illustrating attributes of document case 1 and document case 2 that are inspection targets in the document classification and inspection method according to the embodiment of the invention.

Documents of case 1 and case 2 are all configured by e-mails or the like.

The documents of case 1 and case 2 may be used as a case example for optimizing prediction coding (particularly, for example, sampling, file type classification, or the like).

Weights and scores are calculated based on information relating to a "responsive" document.

In the embodiment of the invention, the e-mail documents of case 1 are mainly written in English, and the e-mail documents of case 2 is written in both of Japanese and English.

The e-mail documents of case 1 and case 2 may be used as a subset.

Further, in the embodiment of the invention, as the e-mail documents of case 2, an e-mail of Apr. 1, 2000 to an e-mail of Mar. 31, 2013 are used.

The time-series score analysis will be described using the documents of case 2 as an example.

Figure 4:
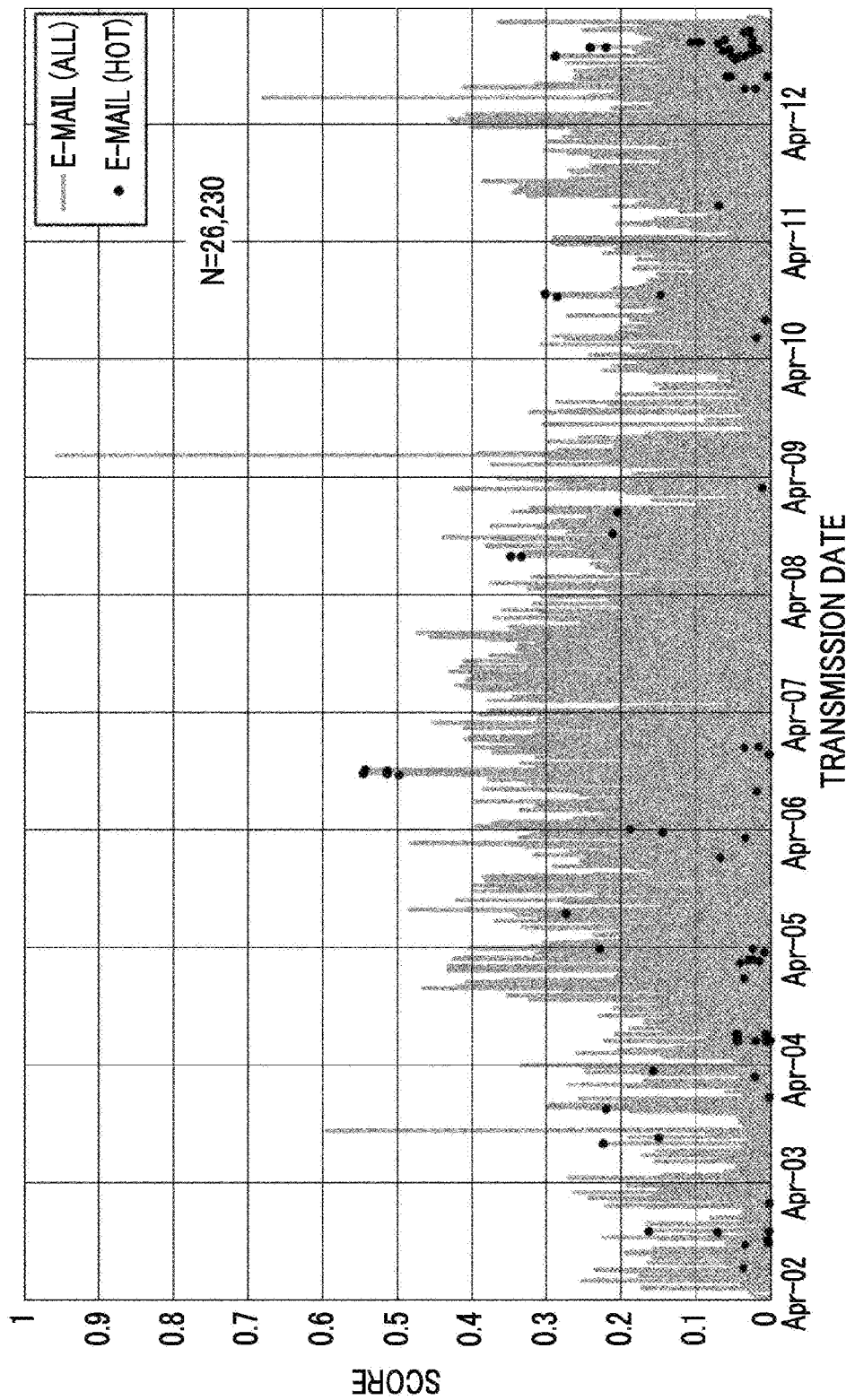
FIG. 4 is a graph illustrating the relationship between a score and a transmission date in the document classification and inspection method according to the embodiment of the invention.

First, referring to FIG. 4, an example of a relationship between a score and a transmission date is shown for the e-mail documents of custodian 1 with respect to case 2.

Then, a moving average of scores is calculated based on the scores, and a characteristic and a tendency obtained by analyzing the moving average are inspected.

Here, the moving average (MA) is as follows.

$$SMA_M = (1/n) \sum_{i=0}^{n-1} Scr_{M-i}$$

Here, SMAM represents a simple moving average of {ScrM, ScrM−1, ... ScrM−(n−1)}. Further, ScrM represents a score of an e-mail document M.

The simple moving average SMA is calculated based on the score ScrM and the scores {ScrM, ScrM−1, ..., ScrM-(n−1)} of the e-mails of which the transmission date is within a predetermined number of days before the transmission date of the e-mail M, with respect to each document (e-mail) M document.

The predetermined number of days may be appropriately determined, and in the present embodiment, 7 days are determined as a short period, 30 days are determined as an intermediate period, and 90 days are determined as a long period.

By using the simple moving average SMA, it is possible to smooth severe fluctuation of the original score values.

FIG. 5 is a graph illustrating the relationship between a moving average of scores and a transmission date.

The predetermined number of days for the moving average of the scores are set to the short period (7 days), the intermediate period (30 days), and the long period (90 days) as described above, and the moving average for each period is calculated, which is shown in FIG. 5.

In FIG. 5, a "HOT" point represents only the transmission date.

Here, a location where the value of the short period moving average changes greatly is present, and it is estimated that the location has a correlation with the "HOT" e-mail.

Next, the calculation of the difference moving average will be described below.

The difference moving average (DMA) is represented as follows.

$$\Delta MA_{M12} = \Delta MA_{M1} - \Delta MA_{m2}$$

Here, MAM1 represents moving average 1 (short period: for example, the short period (7 days)), and MAM2 represents moving average 2 (long period: for example, the intermediate period (30 days)).

If the value of the difference moving average ΔMAM12 is positive, it means that the score value in the immediately previous period (that is, the short period) is large, and it is estimated that transmission or the like of a relatively large number of "HOT" e-mails occurs in the short period, and thus, a change to be inspected occurs. Accordingly, it is possible to obtain a characteristic and a tendency that cannot be obtained by simple comparison of scores by the difference moving average, with respect to the e-mail documents. Here, the change of the characteristic and tendency is detected as an intersection of a difference moving average curve, for example.

FIG. 6 is a graph illustrating the relationship between a difference moving average (DMA) of scores from Apr. 1, 2004 to Mar. 31, 2006 and a transmission date. The difference moving average (DMA) on the longitudinal axis is normalized by the moving average.

FIG. 7 is a table illustrating the relationship between a difference moving average (DMA) of scores, a transmission date, a main (rise) end section (EDGE), and "IN".

The correlation between the "HOT" e-mails and the difference moving average (DMA) is checked. Further, the degree of proximity to the main (rise) end section of the difference moving average (DMA) curve is also checked.

The main (rise) end section (EDGE) refers to an intersection point of a location where the difference moving average (DMA) changes from a negative value to a positive value, that is, an intersection point between the difference moving average (DMA) curve and the horizontal axis.

The "IN" refers to an area where the difference moving average (DMA) is a positive value.

With respect to the "HOT" e-mail documents of the custodian 1, it is checked whether duplicate e-mails having the same date and the same score value are present, for example. By deleting the duplicate e-mail documents, the number of the "HOT" e-mail documents is reduced to 86 from 98. The number of e-mails of which a transmitter cannot be specified due to different addresses is 4, which is few in number.

With respect to the "HOT" e-mails of the custodian 1, if the majority of scores are not a large number, the "end section (EDGE)" or the "IN" is detected in the dates when the e-mails are transmitted.

E-mail documents transmitted in November 2012 and thereafter do not have the "end section (EDGE)" and the "IN". Accordingly, it is estimated that the e-mails relate to communication of a high frequency performed between the custodian 1 and a specific person having the same domain as that of the custodian 1.

The time-series data will be described hereinafter.

The moving average (MA) and the difference moving average (DMA) are excellent indexes for finding basic characteristics and tendencies in the time-series data.

The "end section (EDGE)" of the difference moving average (DMA) may be an index capable of detecting a tendency change point of the score and indicating the presence of the "HOT" e-mail.

The analysis using the moving average (MA) or the difference moving average (DMA) of the score values has a possibility of detecting a specific characteristic (for example, possible "HOT") in the time-series data. Accordingly, it is possible to perform selective dissemination of information (SDI) for a specific custodian or a specific group of custodians.

An example of an execution procedure of analysis of the time-series data will be described hereinafter.

Figure 8:
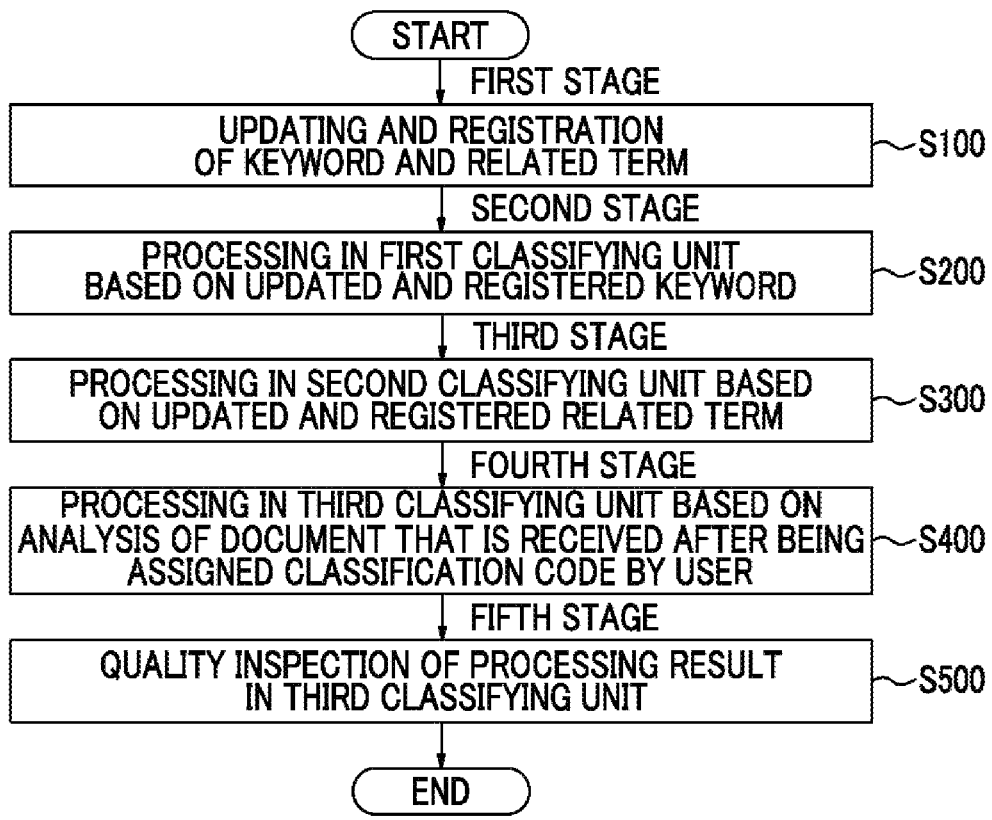
FIG. 8 is a chart illustrating the flow of processes in respective stages in an embodiment.

The analysis of the time-series data according to the embodiment of the invention is performed, for example, in the classification process of the document in association with the document classification. An example of the document classification process will be described hereinafter. In the document classification process, a registration process, a classification process, and an inspection process are performed in first to fifth stages, according to the flowchart shown in FIG. 8.

In the first stage, the keyword and the related term are updated and registered in advance using the result of the previous classification process (S100). Here, the keyword and the related term are updated and registered together with keyword correspondence information and related term correspondence information that are correspondence information of the classification code and the keyword or the related term.

In the second stage, a first classification process of extracting a document including the keyword that is updated and registered in the first stage from all document information, and assigning, if the document is found, the classification code corresponding to the keyword to the document with reference to the updated keyword recorded in the first stage is performed (S200).

In the third stage, the document including the related term that is updated and registered in the first stage is extracted from the document information to which the classification code is not assigned in the second stage, and the score of the document including the related term is calculated. A second classification process of executing assignment of the classification code with reference to the calculated score and the related term correspondence information that is updated and registered in the first stage is performed (S300).

In the fourth stage, the classification code assigned by the user for the document information to which the classification code is not assigned up to the third stage is received, and the classification code received from the user is assigned to the document information. Then, a third classification process of analyzing the document information to which the classification code received from the user is assigned, extracting the document to which the classification code is not assigned based on the analysis result, and assigning the classification code to the extracted document is performed. For example, a word that frequently appears in the documents that are common to the classification code assigned by the user is extracted, the type of the extracted word included in each document, the evaluation value of the word, and the tendency information of the number of appearances are analyzed for each document, and the common classification code is assigned to the document having the same tendency as the tendency information (S400).

In the fifth stage, the user determines the classification code to be assigned based on the analyzed tendency information for the document to which the classification code is assigned in the fourth stage, compares the determined classification code with the classification code assigned by the user, and verifies the validity of the classification process (S500). Further, a learning process may be performed based on the result of the document analysis process as necessary.

The tendency information used in the fourth stage and the fifth stage represents a similarity degree of each document with respect to the document to which the classification code is assigned, which is based on the type of a word included in each document, the number of appearances of the word, and the evaluation value of the word. For example, it is said that when each document is similar to the document to which a predetermined classification code is assigned in the degree of relevance with the predetermined classification code, two documents have the same tendency information. Further, if words having the same evaluation value are included in documents with the same number of appearances, even though the types of the words included in the documents are different from each other, two documents may be handled as documents having the same tendency.

Detailed processing flows in the respective stages of the first to fifth stages will be described hereinafter.

First Stage (S100)

Figure 9:
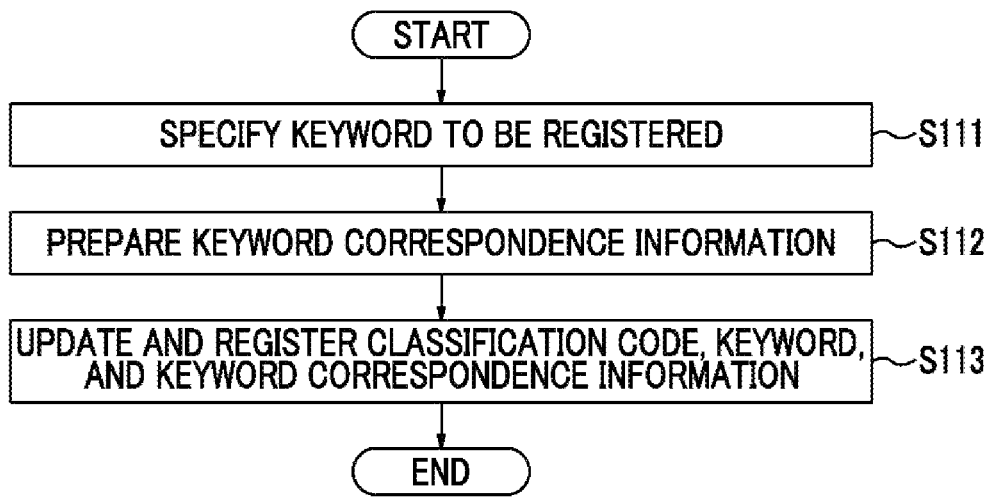
FIG. 9 is a chart illustrating a processing flow of a keyword database in an embodiment.

A detailed processing flow of the keyword database 104 in the first stage will be described with reference to FIG. 9.

The keyword database 104 prepares a management table for each classification code based on a document classification result in a previous lawsuit, and specifies a keyword corresponding to each classification code (S111). In the embodiment of the invention, this specification is performed by analyzing the document to which each classification code is assigned and using the number of appearances and the evaluation value of each keyword in the document, but a method that uses the amount of transmission information included in the keyword, a method in which a user performs manual selection, or the like may be used.

In the embodiment of the invention, for example, when the keyword such as "infringement" or "patent attorney" as the keyword of the classification code "important" is specified, keyword correspondence information indicating that the "infringement" and "patent attorney" are keywords having a close relationship with the classification code "important" is prepared (S112). Then, the specified keywords are registered in the keyword database 104. Here, the specified keywords in association with the keyword correspondence information are stored in the management table of the classification code "important" of the keyword database 104 (S113).

Figure 10:
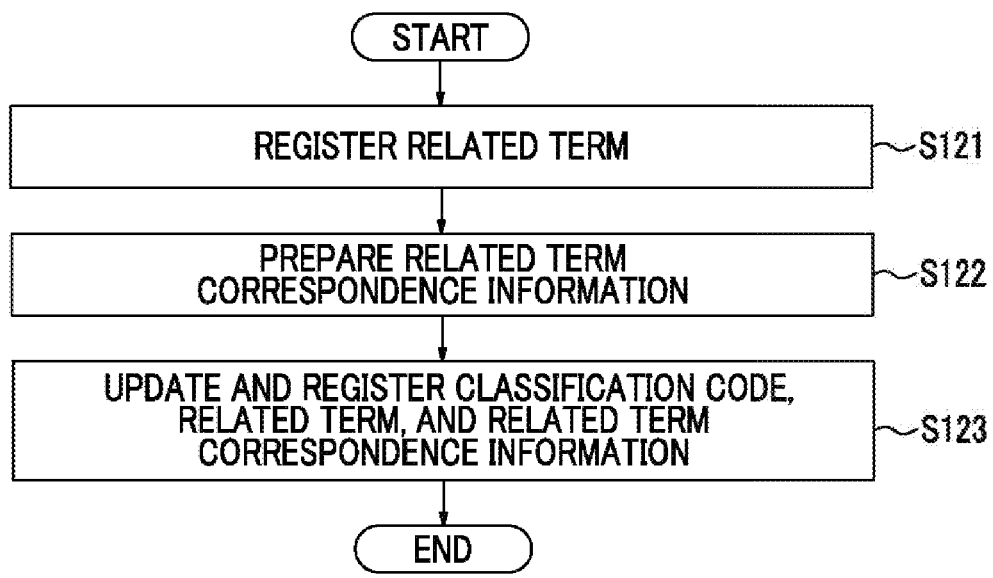
FIG. 10 is a chart illustrating a processing flow of a related term database in the present embodiment.

Next, a detailed processing flow of the related term database 105 will be described with reference to FIG. 10. The related term database 105 prepares a management table for each classification code based on the document classification result in the previous lawsuit, and registers the related term corresponding to each classification code (S121). In the embodiment of the invention, for example, "encoding" and "product a" are registered as the related terms of "product A", and "decoding" and "product b" are registered as the related terms of "product B".

The related term correspondence information indicating which classification code each registered related term corresponds to is prepared (S122), and is recorded in each management table (S123). Here, an evaluation value of each related term and a threshold value that is a score necessary for determination of the classification code are also recorded in the related term correspondence information.

Before actually performing the classification operation, the keyword and the keyword correspondence information, and the related term and the related term correspondence information are updated to the latest one for registration (S113 and S123).

Second Stage (S200)

Figure 11:
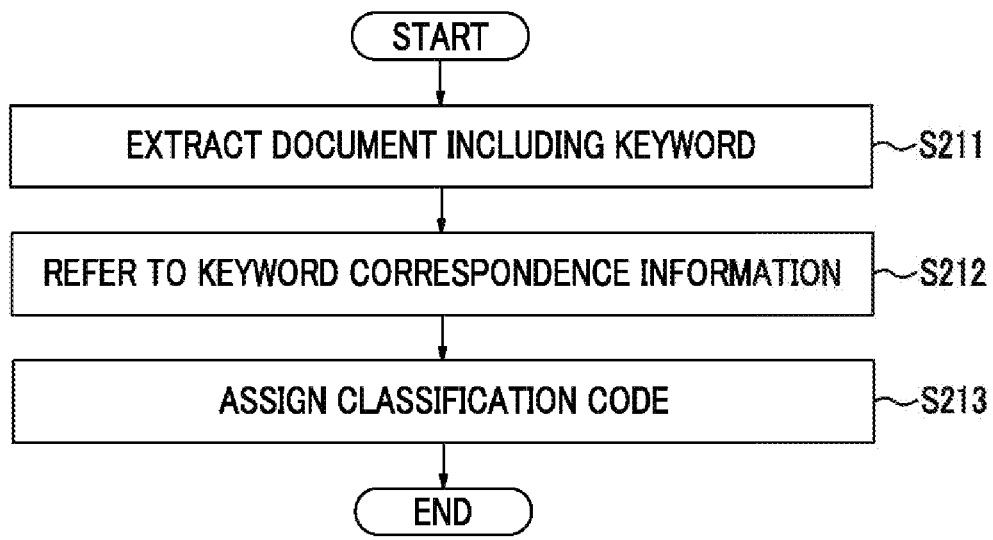
FIG. 11 is a chart illustrating a processing flow of a first automatic classifying unit in the present embodiment.

A detailed processing flow of the first automatic classifying unit 201 in the second stage will be described with reference to FIG. 11. In the embodiment of the invention, in the second stage, a process of assigning the classification code "important" to a document is performed by the first automatic classifying unit 201.

In the first automatic classifying unit 201, a document including the keywords "infringement" and "patent attorney" registered in the keyword database 104 in the first stage (S100) is extracted from the document information (S211). The management table in which the keyword is recorded is referred to from the keyword correspondence information (S212), and the classification code "important" is assigned (S213) to the extracted document.

Third Stage (S300)

Figure 12:
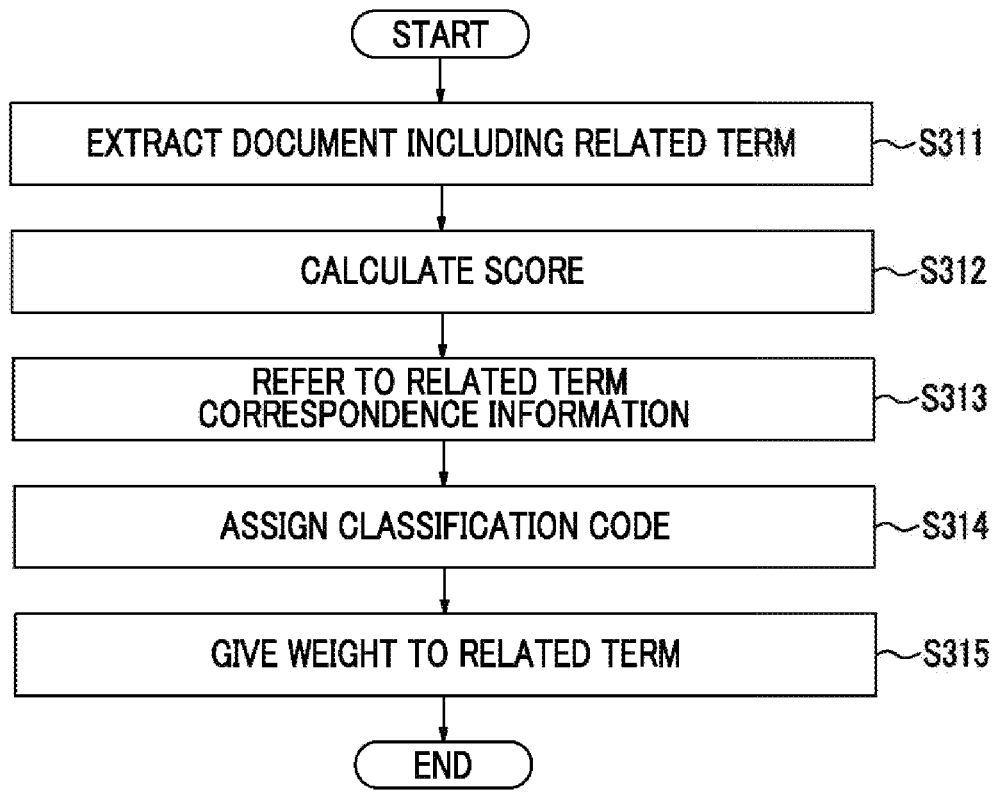
FIG. 12 is a chart illustrating a processing flow of a second automatic classifying unit in the present embodiment.

A detailed processing flow of the second automatic classifying unit 301 in the third stage will be described with reference to FIG. 12.

In the embodiment of the invention, in the second automatic classifying unit 301, a process of assigning the classification code "product A" and "product B" to the document information to which the classification code is not assigned in the second stage (S200) is performed.

The second automatic classifying unit 301 extracts a document including the related terms "encoding", "product a", "decoding" and "product b" recorded in the related term database 105 in the first stage from the document information (S311). A score is calculated by the score calculating unit 116 using the above-mentioned expression (1) based on appearance frequencies and evaluation values of the recorded four related terms, with respect to the extracted document (S312). The score represents the degree of relevance of each document with the classification codes "product A" and "product B".

When the score exceeds the threshold value, the related term correspondence information is referred to (S313), and an appropriate classification code is assigned (S314).

For example, when the appearance frequencies of the related terms "encoding" and "product a" in a certain document and the evaluation value of the related term "encoding" are high, and the score indicating the degree of relevance with the classification code "product A" exceeds the threshold value, the classification code "product A" is assigned to the document.

Here, when the appearance frequency of the related term "product b" in the document is high, and the score indicating the degree of relevance with the classification code "product B" exceeds the threshold value, "product B" is also assigned to the document, together with the classification code "product A". On the other hand, when the appearance frequency of the related term "product b" in the document is low and the score indicating the degree of relevance with the classification code "product B" does not exceed the threshold value, only the classification code "product A" is assigned to the document.

In the second automatic classifying unit 301, the evaluation value of the related term is calculated again, and a weight of the evaluation value is given, by the following expression (2) using the score calculated in S432 in the fourth stage (S315).

$$wgt_{i,L} = \sqrt{wgt_{L-i}^2 + \gamma_L wgt_{i,L}^2 - \theta} = \sqrt{wgt_{i,L}^2 + \Sigma_{i=1}^L (\gamma_i wgt_{i,L}^2 - \theta)} \quad (2)$$

$wgt_{i,O}$: weight of i-th selected keyword before learning (initial value)
$wgt_{i,L}$: weight of i-th selected keyword after L-th learning
$\gamma_L$: learning parameter in L-th learning
$\theta$: threshold value of learning effect For example, when a predetermined number of documents having an abnormally high appearance frequency of "decoding" but having scores which is equal to or lower than a predetermined value occur, the evaluation value of the related term "decoding" is lowered again, and is recorded in the related term correspondence information.

Fourth Stage (S400)

Figure 13:
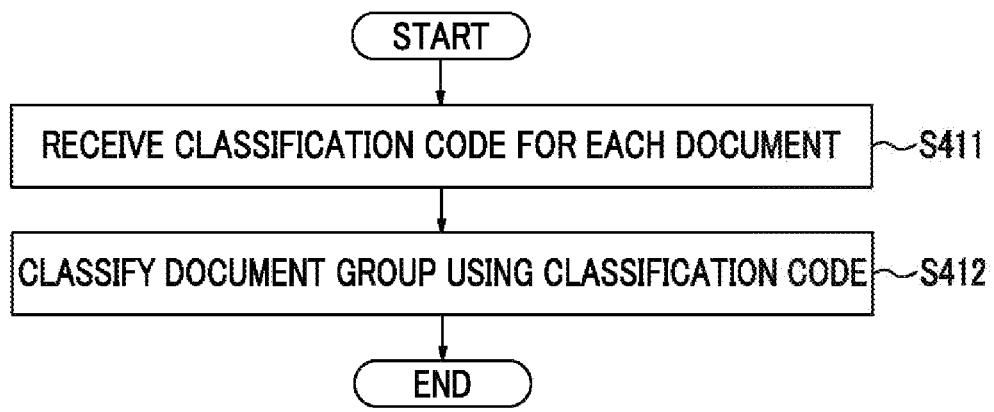
FIG. 13 is a chart illustrating a processing flow of a classification code receiving and assigning unit in the present embodiment.
Figure 14:
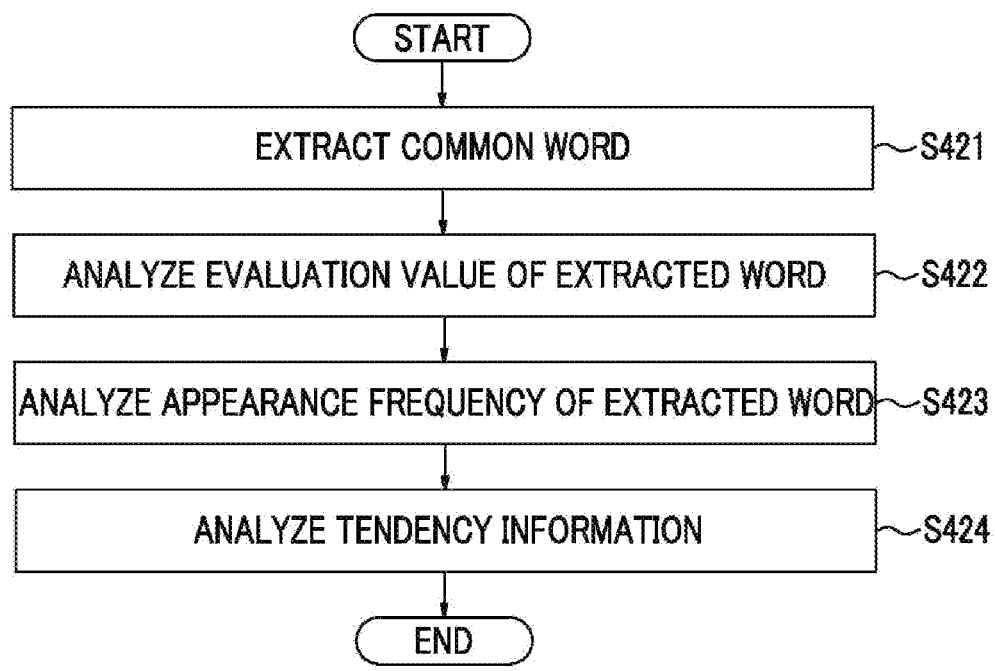
FIG. 14 is a chart illustrating a processing flow of a classification code assigned document analyzing unit in the present embodiment.

In the fourth stage, as shown in FIG. 13, assignment of the classification code from a reviewer for a predetermined proportion of the document information extracted from the document information to which the classification code is not assigned in the processes up to the third stage is received, and the received classification code is assigned to the document information. Then, as shown in FIG. 14, the document information to which the classification code received from the reviewer is assigned is analyzed, and the classification code is assigned to the document information to which the classification code is not assigned based on the analysis result. In the embodiment of the invention, in the fourth stage, a process of assigning the classification codes, for example, "important", "product A", and "product B" to the document information is performed. The fourth stage will be further described hereinafter.

A detailed processing flow of the classification code receiving and assigning unit 131 in the fourth stage will be described with reference to FIG. 13. First, the document extracting unit 112 randomly samples documents from the document information that is the processing target in the fourth stage, and displays the sampled documents in the document display unit 130. In the embodiment of the invention, 20% of the documents in the document information that is the processing target is randomly extracted to be used as a classification target by the viewer. The sampling may be performed by an extraction method of arranging the documents in the order of document preparation dates or document names and selecting 30% of the documents from the top.

Figure 19:
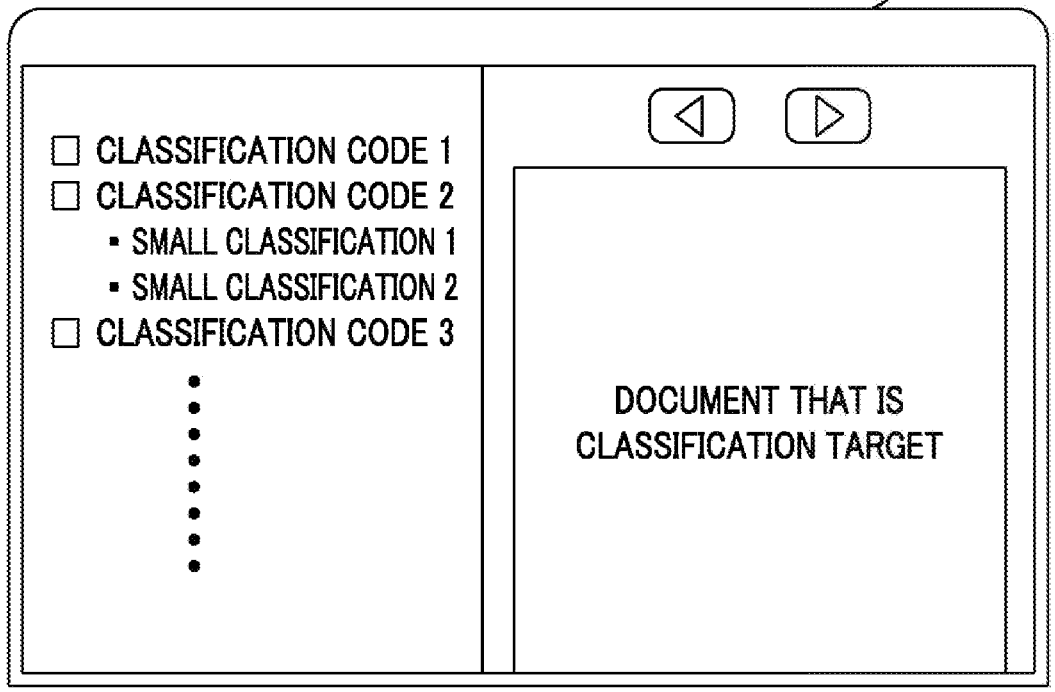
FIG. 19 is a diagram illustrating a document display screen in the present embodiment.

The user browses a display screen 11 shown in FIG. 19 displayed in the document display unit 130, and selects a classification code to be assigned to each document. The classification code receiving and assigning unit 131 receives the classification code selected by the user (S411), and performs classification based on the assigned classification code (S412).

Next, a detailed processing flow of the document analyzing unit 118 will be described with reference to FIG. 14. The document analyzing unit 118 extracts a word that is common to and frequently appears in the documents classified for each classification code by the classification code receiving and assigning unit 131 (S421). The evaluation value of the extracted common word is analyzed by the above-mentioned expression (2) (S422), and the appearance frequency in the document of the common word is analyzed (S423).

Further, the tendency information of the document to which the classification code "important" is assigned is analyzed based on the analysis result in S422 and S423 (S424).

Figure 15:
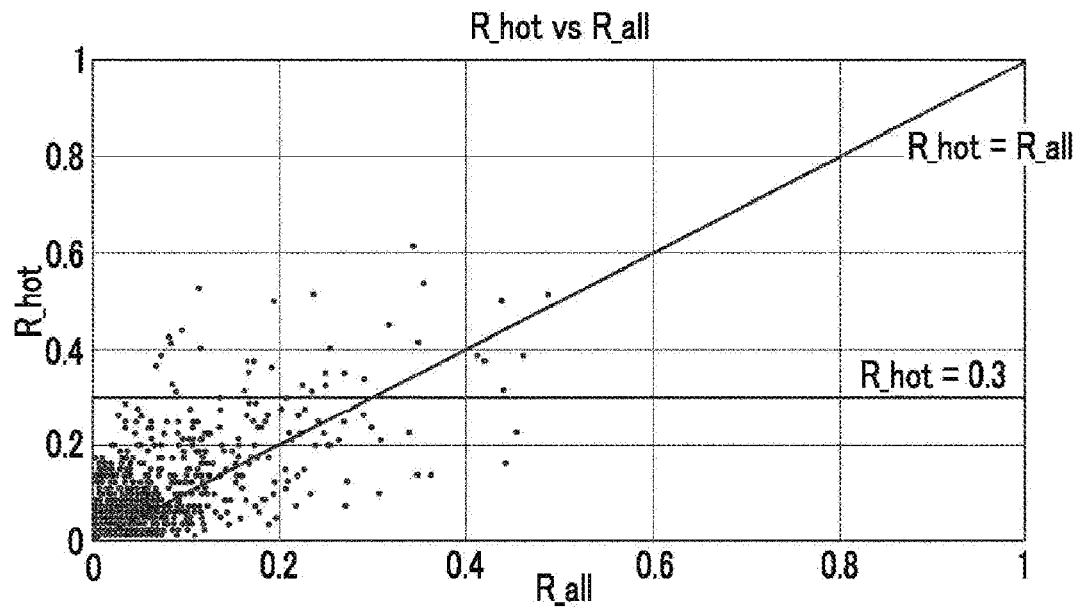
FIG. 15 is a graph illustrating an analysis result in a document analyzing unit in the present embodiment.

FIG. 15 is a graph illustrating an analysis result in S424 with respect to the words that are common to and frequently appear in the documents to which the classification code "important" is assigned.

In FIG. 15, a longitudinal axis R_hot represents the proportion of the documents that include a word selected as a word related to the classification code "important", to which the classification code "important" is assigned, among all the documents to which the classification code "important" is assigned by the user. A transverse axis represents the proportion of the documents that include the word extracted in S421 by the classification code receiving and assigning unit 131 among all the documents for which the user performs the classification process.

In the embodiment of the invention, the classification code receiving and assigning unit 131 extracts the words that are plotted in an upper part with reference to a straight line R_hot=R_all as common words in the classification code "important".

The processes of S421 to S424 are also executed for the document to which the classification codes "product A" and "product B" are assigned, and the tendency information of the document is analyzed.

Figure 16:
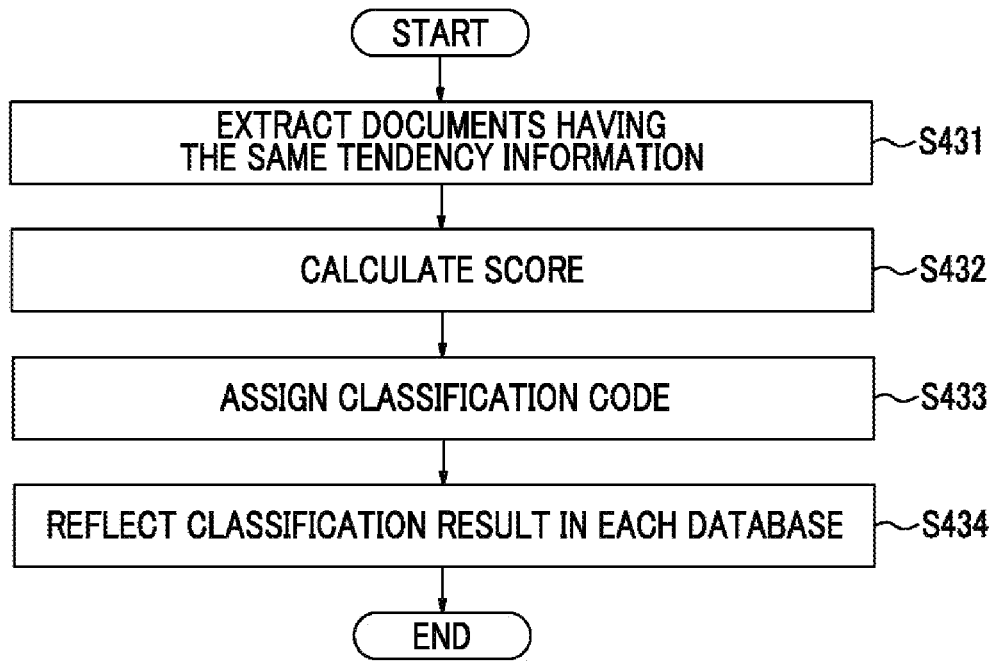
FIG. 16 is a chart illustrating a processing flow of a third automatic classifying unit in an example of the present embodiment.

Next, a detailed processing flow of the third automatic classifying unit 401 will be described with reference to FIG. 16. In the third automatic classifying unit 401, a process is performed for the document in which the assignment of the classification code is not received by the classification code receiving and assigning unit 131 in S411 among the document information that is the processing target in the fourth stage. The third automatic classifying unit 401 extracts the tendency information of the document to which the classification codes "important", "product A", and "product B" are assigned, analyzed in S424, among these documents, and the documents having the same tendency information (S431), and calculates the score using the above-mentioned expression (1) based on the tendency information with respect to the extracted documents (S432). Further, the third automatic classifying unit 401 assigns an appropriate classification code to the documents extracted in S431 based on the tendency information (S433).

In the third automatic classifying unit 401, the classification result is reflected in each database using the score calculated in S432 (S434). Specifically, a process of lowering evaluation values of a keyword and a related term included in the documents having a low score and increasing evaluation values of a keyword and a related term included in a document having a high score may be performed.

Figure 17:
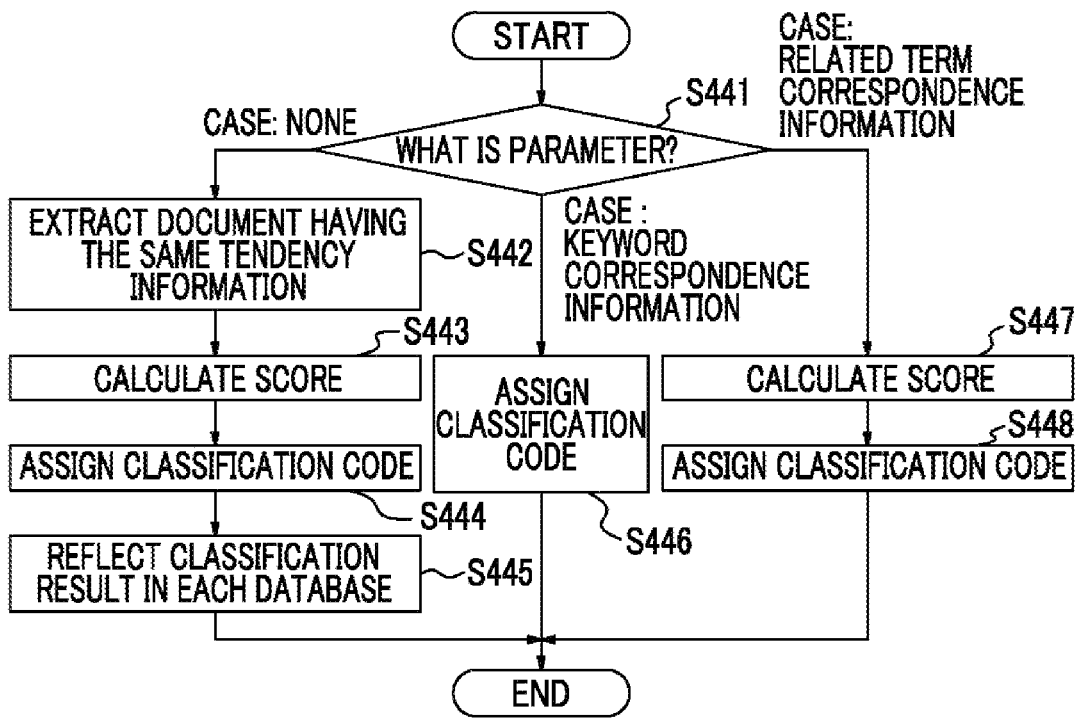
FIG. 17 is a chart illustrating a processing flow of a third automatic classifying unit in another example of the present embodiment.

Further, an example of the detailed processing flow of the third automatic classifying unit 401 will be described with reference to FIG. 17. In the third automatic classifying unit

401, the classification process may be performed for the documents to which the assignment of the classification code is not received by the classification code receiving and assigning unit 131 in S411, among the document information that is the processing target in the fourth stage. When a parameter is not given (S441: No), the third automatic classifying unit 401 extracts the tendency information of the documents to which the classification code "important" is assigned, analyzed in S424, and the documents having the same tendency information from the documents (S442), and calculates the scores for the extracted documents using the above-mentioned expression (1) based on the tendency information (S443). Further, the third automatic classifying unit 401 assigns an appropriate classification code to the documents extracted in S442 based on the tendency information (S444).

In the third automatic classifying unit 401, the classification result is reflected in each database using the scores calculated in S443 (S445). Specifically, a process of lowering evaluation values of a keyword and a related term included in a document having a low score and increasing evaluation values of a keyword and a related term included in a document having a high score is performed.

As described above, the score calculation may be performed by both of the second automatic classifying unit 301 and the third automatic classifying unit 401, and when the number of times of score calculation is large, the data for the score calculation may be stored in the score calculation database 106 in a batch.

Fifth Stage (S500)

Figure 18:
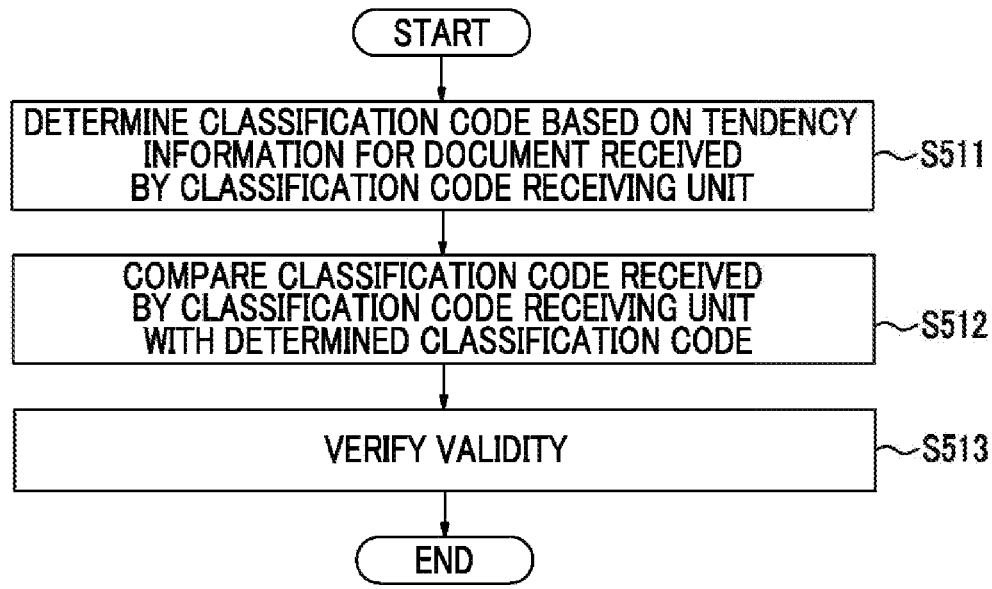
FIG. 18 is a chart illustrating a processing flow of a quality inspecting unit in the present embodiment.

A detailed processing flow of the quality inspecting unit 501 in the fifth stage will be described with reference to FIG. 18. First, the quality inspecting unit 501 determines a classification code to be assigned based on the tendency information analyzed by the document analyzing unit 118 in S424, with respect to the document received in S411 by the classification code receiving and assigning unit 131 (S511).

The classification code received by the classification code receiving and assigning unit 131 and the classification code determined in S511 are compared with each other (S512), and the validity of the classification code received in S411 is verified (S513).

The document classification and inspection system 1 according to the embodiment of the invention may include the learning unit 601. The learning unit 601 learns a weight of each keyword or related term by the above-mentioned expression (2), based on the first to fourth processing results. The learning result may be reflected in the keyword database 104, the related term database 105 or the score calculation database 106.

The document classification and inspection system 1 according to the embodiment of the invention includes the report preparing unit 701 for outputting an optimal inspection report according to the inspection type of the lawsuit case (for example, cartel, patent, FCPA or PL in the lawsuit) or the illegality inspection (for example, information leakage or false invoicing) based on the result of the document analysis process.

Effects of the Embodiment of the Invention

In the embodiment of the invention, the document is extracted from the document information, the score indicating the strength of the connection of the document and the classification code is calculated in a time series manner for the extracted document, the time-series change of the scores is detected from the calculated score, and the degree of relevance of the inspection case and the extracted document is inspected from the detected time-series score change.

Thus, it is possible to provide a document classification and inspection system, a document classification and inspection method, and a document classification and inspection program capable of detecting the time-series change of the quality of the document generated according to time transition in the document classification, and reducing the burden of the classification operation.

What is claimed is:

1. A document classification and inspection system that obtains digital information including document information configured by a plurality of documents recorded in a plurality of computers or servers and assigns to one or more of the documents a classification code indicating the degree of relevance of the documents to an inspection matter, the system comprising;
    at least one processor;
    a memory, wherein the memory has stored thereon instructions that, when executed by the processor, causes the processor to:
    extract a document from the document information;
    calculate, with respect to the extracted document, a score indicating the strength of
    connection of the document and the classification code in a time series manner;
    detect a time-series score change from the calculated score; and
    inspect and determine the degree of relevance between the inspection matter and the extracted document from the detected time-series score change.

2. The document classification and inspection system according to claim 1,
    wherein the the memory has stored thereon further instructions that, when executed by the processor, causes the processor to:
    calculate a moving average of the scores; and
    calculate a difference moving average of the scores from a short period moving average of the scores and a long period moving average of the scores.

3. The document classification and inspection system according to claim 2,
    wherein the the memory has stored thereon further instructions that, when executed by the processor, causes the processor to:
    inspect and determine the degree of relevance between the inspection matter and the extracted document by a point where a sign of a difference between different moving averages changes or an area where the difference between the different moving averages is positive.

4. A document classification and inspection method for obtaining digital information recorded in a plurality of computers or servers, analyzing document information configured by a plurality of documents, included in the obtained digital information, and assigning a classification code indicating the degree of relevance with an inspection matter to a document to make easy use of the inspection matter to inspect the degree of relevance between the inspection matter and the document, the method causing a computer to execute a process comprising:
    extracting a document from a document information, and calculating, with respect to the extracted document, a score indicating the strength of connection of the document and a classification code in a time-series manner;
    detecting a time-series score change from the calculated score; and inspecting the degree of relevance between the inspection matter and the extracted document from the detected time-series score change.

5. The document classification and inspection method according to claim 4, further comprising:
- calculating a moving average of the scores to calculate a short period moving average and a long period moving average of the scores; and
- calculating a difference moving average of the scores from the short period moving average and the long period moving average of the scores to detect the time-series score change.

6. The document classification and inspection method according to claim 5,
- wherein the degree of relevance between the inspection matter and the extracted document is inspected and determined by a point where a sign of a difference between different moving averages changes or an area where the difference between the different moving averages is positive.

7. A non-transitory computer readable medium comprising instructions executable by at least one processor and causing the at least one processor to perform a document classification and inspection method for obtaining digital information recorded in a plurality of computers or servers, analyzing document information configured by a plurality of documents, included in the obtained digital information, and assigning a classification code indicating the degree of relevance with an inspection matter to a document to make easy use of the inspection matter to inspect the degree of relevance between the inspection matter and the document, the method comprising:
- extracting a document from the document information and calculating, with respect to the extracted document, a score indicating the strength of connection of the document and the classification code in a time-series manner;
- detecting a time-series score change from the calculated score; and
- inspecting the degree of relevance between the inspection matter and the extracted document from the detected time-series score change.

* * * * *